(12) United States Patent
Lazaridis et al.

(10) Patent No.: US 8,533,186 B2
(45) Date of Patent: Sep. 10, 2013

(54) METHOD AND DEVICE FOR STORING AND ACCESSING RETAIL CONTACTS

(75) Inventors: Mihal Lazaridis, Waterloo (CA); Sherryl Lee Lorraine Scott, Toronto (CA)

(73) Assignee: BlackBerry Limited, Waterloo (CA)

( * ) Notice: Subject to any disclaimer, the term of this patent is extended or adjusted under 35 U.S.C. 154(b) by 289 days.

(21) Appl. No.: 12/687,956

(22) Filed: Jan. 15, 2010

(65) Prior Publication Data

US 2011/0179018 A1     Jul. 21, 2011

(51) Int. Cl.
*G06F 17/30* (2006.01)
*G06F 7/00* (2006.01)

(52) U.S. Cl.
USPC ............ 707/723; 707/767; 707/769; 707/944

(58) Field of Classification Search
None
See application file for complete search history.

(56) References Cited

U.S. PATENT DOCUMENTS

| | | | |
|---|---|---|---|
| 6,834,195 B2 * | 12/2004 | Brandenberg et al. | 455/456.3 |
| 7,502,606 B2 | 3/2009 | Flynt et al. | |
| 7,509,349 B2 * | 3/2009 | Celik | 1/1 |
| 7,658,327 B2 * | 2/2010 | Tuchman et al. | 235/381 |
| 8,386,509 B1 * | 2/2013 | Scofield et al. | 707/769 |
| 2002/0091577 A1 * | 7/2002 | Parry et al. | 705/26 |
| 2004/0018857 A1 | 1/2004 | Asokan | |
| 2005/0091207 A1 * | 4/2005 | Shimizu et al. | 707/3 |
| 2005/0182837 A1 * | 8/2005 | Harris et al. | 709/226 |
| 2006/0046768 A1 * | 3/2006 | Kirbas | 455/550.1 |
| 2006/0058011 A1 * | 3/2006 | Vanska et al. | 455/414.3 |
| 2007/0033217 A1 * | 2/2007 | Basner | 707/102 |
| 2007/0061301 A1 * | 3/2007 | Ramer et al. | 707/3 |
| 2007/0143364 A1 * | 6/2007 | Chen et al. | 707/203 |
| 2007/0233654 A1 | 10/2007 | Karlson | |
| 2008/0071544 A1 | 3/2008 | Beaufays et al. | |
| 2008/0222127 A1 * | 9/2008 | Bergin | 707/5 |
| 2008/0234006 A1 | 9/2008 | Lee et al. | |
| 2009/0104920 A1 * | 4/2009 | Moon et al. | 455/456.3 |
| 2009/0131028 A1 * | 5/2009 | Horodezky et al. | 455/418 |
| 2009/0281923 A1 * | 11/2009 | Selinger et al. | 705/27 |

FOREIGN PATENT DOCUMENTS

| | | |
|---|---|---|
| EP | 1 487 184 | 12/2004 |
| EP | 1 783 988 | 5/2007 |

OTHER PUBLICATIONS

European Search Report, dated Jul. 23, 2010.

* cited by examiner

*Primary Examiner* — Jung Kim
*Assistant Examiner* — James J Wilcox
(74) *Attorney, Agent, or Firm* — Ridout & Maybee LLP

(57) ABSTRACT

A method and device for storing and accessing retail contacts. The retail contact data includes retail contact information detailing a plurality of retail contacts, keywords, and a plurality of associations linking each retail contacts to at least one of the keywords. User input of a keyword results in display of the associated retail contacts. Selection of a retail contact from the display may result in initiation of a session such as a voice call or website access.

21 Claims, 8 Drawing Sheets

METHOD AND DEVICE FOR STORING AND ACCESSING RETAIL CONTACTS

FIELD

The present application generally relates to contact information stored in mobile devices and, more specifically, to pre-loading, categorizing and accessing contact information and contact-related data.

BACKGROUND

Many modern mobile communication devices include an address book, in which users may store personal contacts, including names, phone numbers, addresses, and other such information. In some instances the phone application on the device permits searching or looking-up of personal contacts. The search is typically for a match to the person's name.

In a retail context, it would be advantageous to provide for a mobile communication device and method implemented in such a device that quickly provides a user with relevant retail contact information and enhanced retail ordering options.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
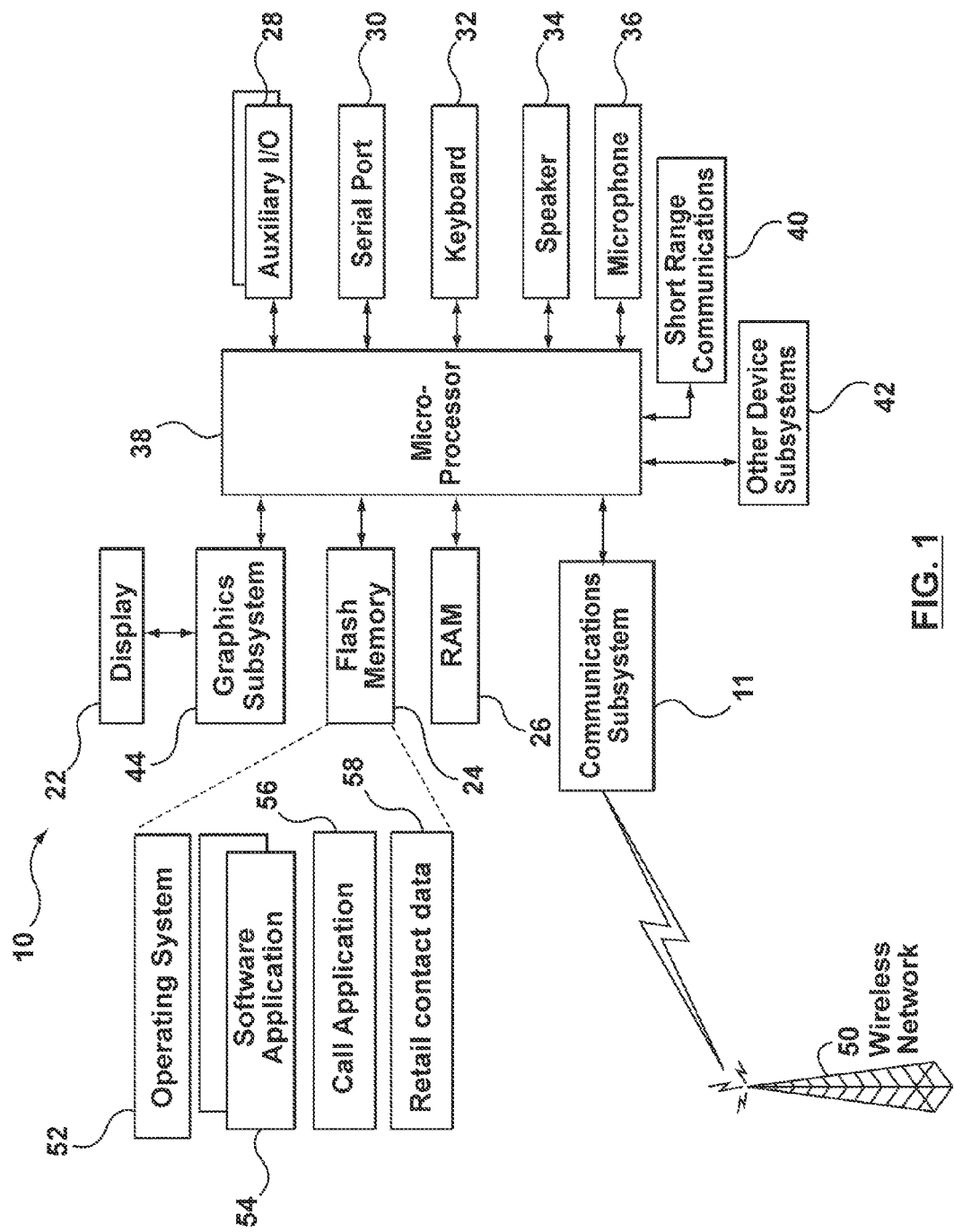
FIG. 1 shows an example embodiment of a mobile communication device.

In one aspect, the present application describes a method of connecting with a retail contact using a mobile communication device, the mobile communication device having a display and an input device. The method includes storing retail contact data in memory on the mobile communication device, wherein the retail contact data includes retail contact information detailing a plurality of retail contacts, a plurality of keywords, and a plurality of associations linking each retail contact to one or more of the keywords; receiving an input search term through the input device; determining that the input search term matches one of the keywords; identifying each retail contact linked to the matching keyword by one of the associations and retrieving retail contact information for each of the identified retail contacts; displaying on the display the retail contact information retrieved for each of the identified retail contacts; receiving a selection of one of the retail contacts displayed on the display; and initiating a communication with the retail contact using a retail contact electronic address contained within the retail contact information for the selected retail contact.

In another aspect, the present application provides a mobile communication device. The device includes a processor; a memory; an input device; a display; a communication subsystem; and a contact application stored in memory and containing instructions for configuring the processor to connect with a retail contact. The instructions includes instructions for storing retail contact data in said memory, wherein the retail contact data includes retail contact information detailing a plurality of retail contacts, a plurality of keywords, and a plurality of associations linking each retail contact to one or more of the keywords, receiving an input search term through the input device, determining that the input search term matches one of the keywords, identifying each retail contact linked to the matching keyword by one of the associations and retrieving retail contact information for each of the identified retail contacts, displaying on the display the retail contact information retrieved for each of the identified retail contacts, receiving a selection of one of the retail contacts displayed on the display, and initiating a communication with the retail contact using a retail contact electronic address contained within the retail contact information for the selected retail contact.

In yet another aspect, the present application provides a computer-readable medium containing program code or instructions for configuring a processor to implement the method described above.

In some instances, the following description refers to initiating a session or a call. It will be appreciated that a voice call is but one example of a possible session. It will also be appreciated that sessions may be established over connection-based or connectionless protocols, depending on the implementation. The term "session" in this application is intended to be broad enough to include accessing a retailer's website through which a retail order may be placed, regardless of whether or not session tokens are actually used in the transaction. Although specific embodiments detailed below make reference to voice calls, it will be understood that the present application is not limited to voice calls.

Reference is now made to FIG. 1, which shows an example embodiment of a mobile communication device 10. The mobile communication device 10 is a two-way communication device having voice and possibly data communication capabilities; for example, the capability to communicate with other computer systems, e.g., via the Internet. Depending on the functionality provided by the mobile communication device 10, in various embodiments the device may be a multiple-mode communication device configured for both data and voice communication, a smartphone, a mobile telephone or a PDA (personal digital assistant) enabled for wireless communication, or a computer system with a wireless modem.

The mobile communication device 10 includes a controller comprising at least one processor 38 such as a microprocessor which controls the overall operation of the mobile communication device 10, and a wireless communication subsystem 11 for exchanging radio frequency signals with the wireless network 50. The processor 38 interacts with the communication subsystem 11 which performs communication functions. The processor 38 interacts with additional device subsystems. In some embodiments, the device 10 may include a touch-screen display which includes a display (screen) 22, such as a liquid crystal display (LCD) screen, with a touch-sensitive input surface or overlay connected to an electronic controller.

The touch-sensitive overlay and the electronic controller 208 provide a touch-sensitive input device and the processor 38 interacts with the touch-sensitive overlay via the electronic controller. In other embodiments, the display 22 may not be a touchscreen display. Instead, the device 10 may simply include a non-touch display and one or more input mechanisms, such as, for example, a depressible scroll wheel, a keypad, a trackball, a pen, etc. The device 10 may include a graphics subsystem 44 for rendering graphic elements and/or text, and controlling the display 22. In some embodiments, the display may be controllable through voice commands.

The processor 38 interacts with additional device subsystems including flash memory 24, random access memory (RAM) 26, read only memory (ROM), auxiliary input/output (I/O) subsystems 28, data port 30 such as serial data port, such as a Universal Serial Bus (USB) data port, speaker 34, microphone 36, keyboard 32, short-range communication subsystem 40, and other device subsystems generally designated as 42. Some of the subsystems shown in FIG. 12 perform communication-related functions, whereas other subsystems may provide "resident" or on-device functions.

The communication subsystem 11 may include a receiver, a transmitter, and associated components, such as one or more antennas, local oscillators (LOs), and a processing module such as a digital signal processor (DSP). The antennas may be embedded or internal to the mobile communication device 10 and a single antenna may be shared by both receiver and transmitter, as is known in the art. As will be apparent to those skilled in the field of communication, the particular design of the communication subsystem 11 depends on the wireless network 50 in which the mobile communication device 10 is intended to operate.

The mobile communication device 10 may communicate with any one of a plurality of fixed transceiver base stations of a wireless network 50 within its geographic coverage area. The mobile communication device 10 may send and receive communication signals over the wireless network 50 after a network registration or activation procedures have been completed. Signals received by the device 10 through the wireless network 50 are input to the receiver, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP. In a similar manner, signals to be transmitted are processed, including modulation and encoding, for example, by the DSP. These DSP-processed signals are input to the transmitter for digital-to-analog (D/A) conversion, frequency up conversion, filtering, amplification, and transmission to the wireless network 50.

The processor 38 operates under stored program control and executes software modules stored in memory such as persistent memory, for example, in the flash memory 24. As illustrated in FIG. 1, the software modules may include operating system software 52 and software applications 54.

Those skilled in the art will appreciate that the software modules or parts thereof may be temporarily loaded into volatile memory such as the RAM 26. The RAM 26 and/or a cache are used for storing runtime data variables and other types of data or information, as will be apparent to those skilled in the art. Although specific functions are described for various types of memory, this is merely one example, and those skilled in the art will appreciate that a different assignment of functions to types of memory could also be used.

The software applications 54 may include a range of other applications, including, for example, a messaging application, a calendar application, and/or a notepad application. In some embodiments, the software applications 54 include an email message application, a push content viewing application, a voice communication (i.e. telephony) application, a map application, and a media player application. Each of the software applications 54 may include layout information defining the placement of particular fields and graphic elements (e.g. text fields, input fields, icons, etc.) in the user interface (i.e. the display device 22) according to the application.

In some embodiments, the auxiliary input/output (I/O) subsystems 28 may comprise an external communication link or interface, for example, an Ethernet connection. The mobile communication device 10 may comprise other wireless communication interfaces for communicating with other types of wireless networks, for example, a wireless network such as an orthogonal frequency division multiplexed (OFDM) network or a GPS transceiver for communicating with a GPS satellite network (not shown). The auxiliary I/O subsystems 28 may include a vibrator for providing vibratory notifications in response to various events on the mobile communication device 10 such as receipt of an electronic communication or incoming phone call, or for other purposes such as haptic feedback (touch feedback). The auxiliary I/O subsystems 28 may also include other input mechanisms, such as a trackwheel, trackball, touchpad, etc.

In some embodiments, the mobile communication device 201 also includes a removable memory card (typically comprising flash memory) and a memory card interface (not illustrated). Network access may be associated with a subscriber or user of the mobile communication device 10 via the memory card, which may be a Subscriber Identity Module (SIM) card for use in a GSM network or other type of memory card for use in the relevant wireless network type. The memory card is inserted in or connected to the memory card interface of the mobile communication device 10 in order to operate in conjunction with the wireless network 50.

The mobile communication device 10 stores data in an erasable persistent memory, which in one example embodiment is the flash memory 24. In various embodiments, the data includes service data information required by the mobile communication device 10 to establish and maintain communication with the wireless network 50. The data may also include user application data such as email messages, address book and contact information, calendar and schedule information, notepad documents, image files, and other commonly stored user information stored on the mobile communication device 10 by its user, and other data. The data stored in the persistent memory (e.g. flash memory 24) of the mobile communication device 10 may be organized, at least partially, into a number of databases each containing data items of the same data type or associated with the same application.

The serial data port 30 may be used for synchronization with a user's host computer system (not shown). The serial data port 30 enables a user to set preferences through an external device or software application and extends the capabilities of the mobile communication device 10 by providing for information or software downloads to the mobile communication device 10 other than through the wireless network 50. The alternate download path may, for example, be used to load an encryption key onto the mobile communication device 10 through a direct, secure and trusted connection to thereby provide secure device communication.

A predetermined set of applications that control basic device operations, including data and voice communication applications will normally be installed on the mobile communication device 10 during or after manufacture. Additional applications and/or upgrades to the operating system 52 or software applications 54 may also be loaded onto the mobile communication device 10 through the wireless network 50, the auxiliary I/O subsystem 28, the serial port 30, the short-range communication subsystem 40, or other suitable subsystem other wireless communication interfaces. The downloaded programs or code modules may be permanently installed, for example, written into the program memory (i.e. the flash memory 24), or written into and executed from the RAM 26 for execution by the processor 38 at runtime. Such flexibility in application installation increases the functionality of the mobile communication device 10 and may provide enhanced on-device functions, communication-related functions, or both.

The wireless network 50 may comprise one or more of a Wireless Wide Area Network (WWAN) and a Wireless Local Area Network (WLAN) or other suitable network arrangements. In some embodiments, the mobile communication device 10 is configured to communicate over both the WWAN and WLAN, and to roam between these networks. In some embodiments, the wireless network 50 may comprise multiple WWANs and WLANs. In some embodiments, the mobile device 10 includes the communication subsystem 11 for WWAN communications and a separate communication subsystem for WLAN communications.

In some embodiments, the WWAN conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSPDA (High-Speed Downlink Packet Access), IEEE 802.16e (also referred to as Worldwide Interoperability for Microwave Access or "WiMAX), or various other networks. Although WWAN is described as a "Wide-Area" network, that term is intended herein also to incorporate wireless Metropolitan Area Networks (WMAN) and other similar technologies for providing coordinated service wirelessly over an area larger than that covered by typical WLANs.

The WLAN comprises a wireless network which, in some embodiments, conforms to IEEE 802.11x standards (sometimes referred to as Wi-Fi) such as, for example, the IEEE 802.11a, 802.11b and/or 802.11g standard. Other communication protocols may be used for the WLAN in other embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN includes one or more wireless RF Access Points (AP) that collectively provide a WLAN coverage area.

Amongst the software applications 54 stored in memory on the mobile communications device 10 is a call application 56. The call application 56 is configured to initiate voice calls, either over a WWAN (or cellular) interface or over a WLAN (or VoIP) interface. It will be appreciated that in some devices VoIP calls can also be established over the WWAN interface. The call application 56 manages the call set-up, management, and tear-down process from the device end. Accordingly, in concert with lower layer radio elements of the device 10, the call application 56 is configured to send address information (such as a telephone number, SIP URI, or other identifier) over the wireless interface to initiate a call in accordance with an applicable protocol. It is also configured to receive incoming call notifications and to alert the user to same. In cooperation with the network, the call application 56 manages maintenance of the call, including any mid-call functions such as hold, conference, transfer, or other call-operations, and manages the signaling associated with ending the call.

The call application 56 is configured to display an interface on the display device 22 before and during a call. In some example embodiments, the interface may be a graphical user interface containing various call-related elements. For example, pre-call the interface may include a navigable list of previously received and/or initiated calls. It may also include an input field for receiving and displaying input from a user, such as the digits of a phone number, or the name of a contact. Various other elements may also be incorporated into the interface.

Also stored in memory on the device 10 is retail contact data 58. The retail contact data 58 is contact data specifically relating to commercial vendors of products and services, as opposed to personal individual contacts as may be found in a conventional address book. As will be described in greater detail below, the call application 56 is configured to access, manage, update, and display elements of the retail contact data 58 to facilitate the initiation of a call or other session (such as an HTTP session) to a retail contact or access to the retail contact's website. As will be clear from the following description, the call application 56 and retail contact data 58 are configured to allow quick user access to desired retail contact information with a minimum number of keystrokes or other inputs, thereby reducing processor load and speeding up session initiation. In some embodiments, the call application 56 and retail contact data 58 are configured to enable more efficient retail ordering by obtaining and transmitting order data gathered before or during a voice call. Further details regarding the order enhancement aspects are follow the detailed description of the call application 56 and the retail contact data 58.

Figure 2A:
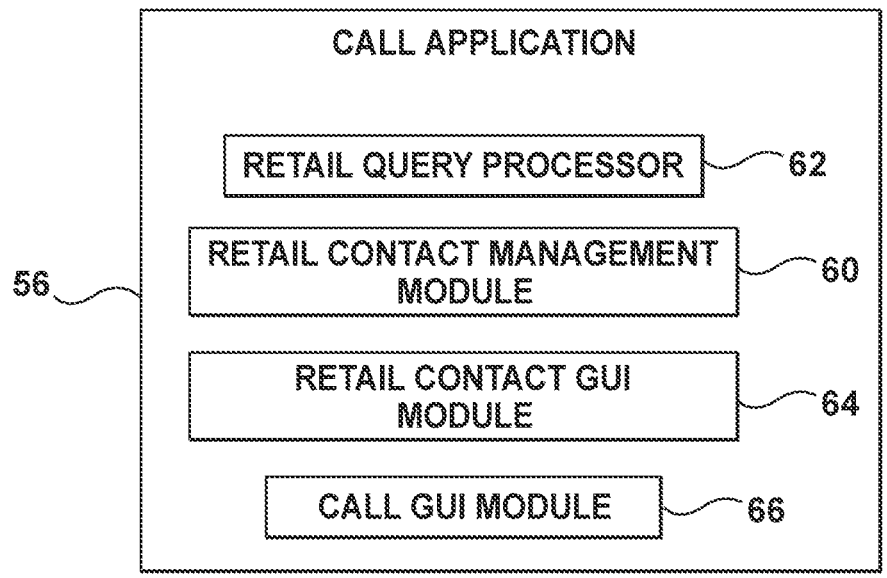
FIG. 2A shows an example embodiment of the call application.

Reference is now made to FIG. 2, which diagrammatically shows an example embodiment of the call application 56 and the retail contact data 58. In this example, all aspects of interacting with and managing the retail contact data 58 are implemented by way of software modules or routines within the call application 56. It will be appreciated that these modules or routines may be implemented in other software applications, like a browser, or within the operating system 54 itself in other embodiments. Moreover, although the call application 56 is shown in FIGS. 1 and 2 as a stand-alone application, this is for ease of illustration and it will be understood that the call application 56 may, in some instances, be implemented within a general communications application, within another software application, or as part of the operating system 54 itself.

Referring still to FIG. 2, the retail contact data 58 includes retail contact information 70. Retail contact information 70 includes at least identifying information for a retail contact and the retail contact's addresses, such as a phone number, a SIP URI, a web address, or other unique address information for addressing communications to the retail contact. The retail contact information 70 may also include other retailer-specific information, such as mailing address information, preferred store location, etc. In some embodiments the retail contact information 70 may also include a logo or other retailer-specific graphic or identifier. As will be described further below, in some instances, the retail contact information 70 may include information on retail special offers or coupons.

The retail contact data 58 also includes a set of keywords 72. The keywords 72 may include broad category names associated with retail groupings, such as "taxi", "pizza", or "toys". The keywords 72 may also include nicknames or other keywords, such as, for example, "tx", "za", or "kids".

The retail contact data 58 further includes associations 74 that link a keyword 72 to one or more retail contacts stored in the retail contact information 70. For example, an association 74 may link the keyword "pizza" to retail contact information for Dominos™, Pizza Pizza™, Little Ceasar's™, etc. In some cases, a retail contact may have a number of associations with a number of keywords. For example, Dominos™ may have stored associations 74 to the keywords 72 "pizza", "piz", "za", "food", "snack", "hungry", etc.

Keywords 72 may not necessarily be text and, in some embodiments, may include voice keywords.

The retail contact data 58 may also include retail history data 76. The retail history data 76 may include retailer-specific order history. For example, it may include the nature of the products or services recently ordered from a given retailer. As an example, this data may include details of the pizzas most recently ordered from a given pizza retailer. The retail history data 76 may also include contact history for the retailers. For example, it may include data regarding how often and how recently each retailer has been contacted, by voice call, through web browsing, etc. This data may be useful in ranking or ordering retailers when presenting keyword query results, as will be described further below.

The call application 56 may include a number of modules or components, including a retail contact management module 60, a retail query processor 62, a retail contact GUI module 64, and a call GUI module 66. The call GUI module 66 is a user-interactive GUI display module for receiving user input/selections and outputting call related data to the display 22 (FIG. 1). As noted above, the user interface provided by the call GUI module 66 may include a navigable list of recently called contacts, retail or personal, an input field for accepting alphanumeric input data, and/or display fields for showing current call status, current call address information, etc.

The retail contact GUI module 64 is a user-interactive GUI display module for interacting with the retail contact data 58. The display rendered by the module 64 may include, among other elements, a user keyword input field for receiving alphanumeric input. In some embodiments, this is the same input field as is used in the call GUI module 64. In some embodiments, these GUIs may be integrated into a single GUI for managing both functions.

The retail contact GUI module 64 may be configured to receive user selection of a particular retail contact, and retrieve related information from the retail contact information 70. The retail contact GUI module 64 may also be configured to receive an input keyword, and to retrieve and display the retail contacts associated with the input keyword. The display of retail contacts may be a navigable display from which a selection may be made, for example by touch input, trackball input, keyboard input, gesture input, voice command input, etc.

The retail contact management module 60 enables administration or manipulation of the retail contact data 58. In some situations, the retail contact management module 60 may facilitate user or administrator modifications to the retail contact data 58, such as to add or delete contacts, create new keywords, or create or break associations. In other situations, the retail contact management module 60 may perform similar functions without user or administrator commands or instructions. In other words, some management functions, like ordering or ranking retail contacts, or generating new associations, may be performed automatically, i.e. without specific user instruction/command. The retail contact management module 60 may also provide a browsing function for displaying the retail contact information 70 in a browsable or navigable display. The retail contacts may be displayed in a list, or by category/keyword, or by logo in a grid format, etc. The range of possibilities will be appreciated by those skilled in the art.

In some instances, the retail contact management module 60 may provide a keyword 72 display, where keywords 72 are organized and displayed in a navigable list. Selection of one of the keywords 72 may result in display of associated retailers. The keywords 72 may include a set of primary keywords 72 or "categories", with sub-keywords defined therein in some cases. The navigable display may begin with the primary keywords, and may permit expansion to show sub-keywords in a tree-and-branch architecture. Other alternatives will be understood by those skilled in the art having regard to the description herein.

The call application 56 may also include a retail query processor 62 for retrieving retail contact information 70 from the retail contact data 58 in response to an input keyword. The input keyword may be received by the retail contact GUI module 64 (or call GUI module 66, if integrated), and passed to the retail query processor 62. It will be understood that the retail query processor 62 may be implemented within the retail contact GUI module 64 or call GUI module 66, in some embodiments. The retail query processor 62 may, in some embodiments, perform a look-up based on matching the input keyword with the keywords 72. This process may be dynamic, such that it occurs as a user enters each alphanumeric character into an input field, and results are displayed in a picklist adjacent the input field. As additional characters are entered, the search narrows the candidate keywords on the picklist. In some embodiments, the retail query processor 62 may require an exact match to a stored keyword 72. In other embodiments, the retail query processor 62 may retrieve and present non-matching keywords 72 based on a phrase or word approximation algorithm. Other query processing operations may be incorporated.

Once the retail query processor 62 has identified a keyword within the stored keywords 72 that matches (or closely corresponds to) the input keyword, the retail query processor 62 identifies and retrieves the retail contact information 70 linked to the identified keyword by the associations 74. It then passes the retrieved retail contact information 70 to the retail contact GUI module 64 for display.

Figure 2B:
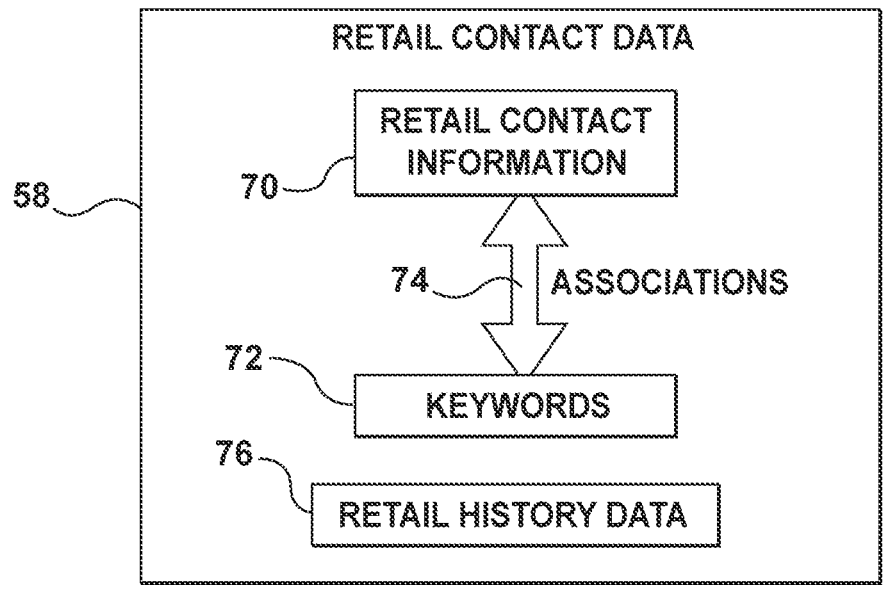
FIG. 2B shows an example embodiment of the retail contact data.
Figure 3:
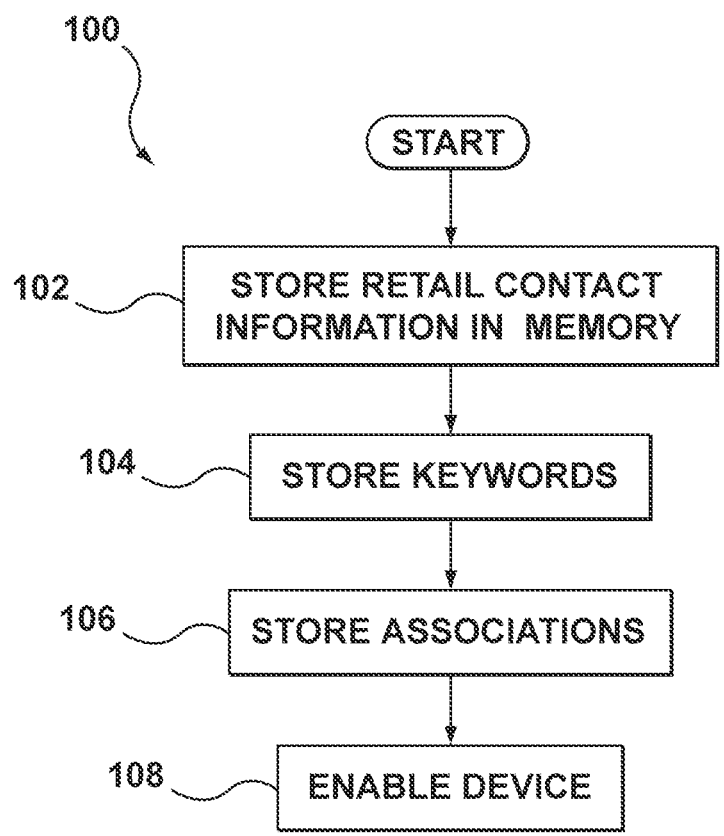
FIG. 3 shows, in flowchart form, a method of storing retail contact data.

Reference is now made to FIG. 3, which shows, in flowchart form, a method 100 of storing retail contact data. The method 100 begins in step 102 with loading and storing the retail contact information 70 (FIG. 2B) into memory on the device 10 (FIG. 1). In steps 104 and 106, the keywords 72 (FIG. 2B) and associations 74 (FIG. 2B) are also loaded and stored in memory on the device 10. After the retail contact data 58 (FIG. 2B) has been stored on the device 10, the device 10 is then enabled for use in step 108. In other words, the retail contact data 58 is pre-loaded or pre-stored on the device 10 before the device 10 is provided to an end-user. The operations of storing the retail contact data 58 on the device 10 may be performed as a part of provisioning the device 10, which may include loading service data, basic application software, branding information, etc. This operation may be performed in part by a manufacturer of the device 10 and/or in part by a vendor of the device 10, such as a telecommunications carrier. In some instances, the carrier brands devices 10 with carrier-related logos or information, including software branding. In this context, the carrier may wish to pre-load the device with retail contact data 58 having associations that reflect preferred retail contacts from the point-of-view of the carrier. In some instances, the call application 56 may provide a mechanism or operation for enabling or disabling the pre-loaded retail contact data 58, so as to enable or override the carrier-selected retail contact listings accessible through the call application 56.

Although illustrated separately in FIG. 3, it will be understood that steps 102, 104, and 106 may be performed in a different order, or together in a single operation.

Figure 4:
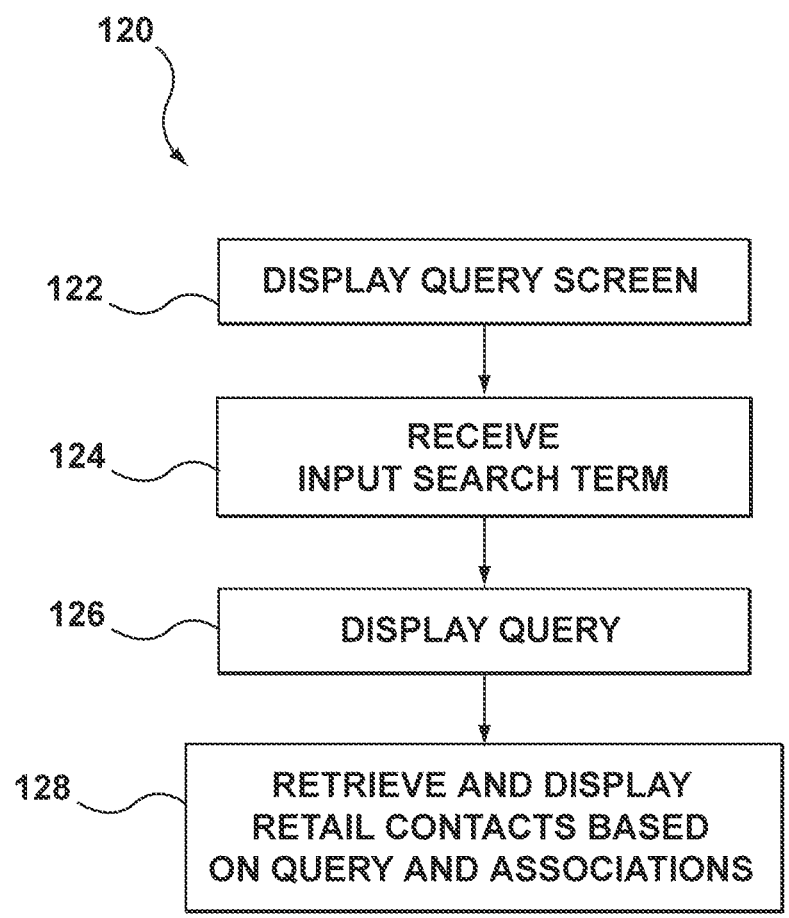
FIG. 4 shows a flowchart for an example method of selecting and displaying retail contact information.

Reference is now made to FIG. 4, which shows a flowchart for an example method 120 of selecting and displaying retail contact information. The method 120 begins with display of a query interface in step 122. The query interface may be a GUI display screen associated with an address book, contact application program, call initiation screen, etc. The query interface includes, among other things, an input field for receiving and displaying alphanumeric characters of a search term or string. Step 124 includes receiving the input search term or string. In many embodiments, the input field may be a text input field and step 124 includes receiving keyboard or keypad inputs defining the input search term.

In step 126 the query is processed. Step 126 may be initiated on receipt of a "search" command, such as by way of a carriage return, GUI button, gesture, touchscreen input, etc. In some embodiments, the query may be dynamically processed with each alphanumeric character input to the input field.

The processing of the query may include searching the keywords 72 (FIG. 2B) for matches to the input search term. In some instances, more advanced query processing may be used, including word or phrase matching and approximations rather than an exact match condition. The call application 56 (FIG. 2A) may be configured to display candidate keywords 72 that meet threshold match criteria if an exact match is not found. The call application 56 may then be configured to accept selection of one of the candidate keywords.

On finding a match, or receiving selection of a candidate keyword, then in step 128 the call application 56 retrieves and displays retail contact information 70 (FIG. 2B) associated with the keyword 72 selected through the query processing. The associations 74 are used to identify associated retail contact information 70.

The associations 74 may, in one embodiment, be weighted based on various factors. A strong association 74 may be built between a keyword 72 and a particular retail contact if, for example, that retail contact has previously been selected and contacted (by phone or otherwise) following use of the keyword 72. The frequency of use may forge a stronger association 74 between a given retail contact and keyword 72. In another example, physical proximity may be used to change the weighting of associations 74. For instance, the device 10 may determine its location based on GPS data or cellular node information, and may compare its location to the nearest locations of the retailers associated with a given keyword 72 in order to rank the retailers on the basis of proximity. Other methods or ranking or ordering the retailers may be used.

In step 128, the retail contacts associated with the keyword 72 are displayed. In some instances, the retail contact information 70 displayed on the display screen 22 (FIG. 1) may include a retailer name, contact information (phone number, website address, etc.), a retailer logo or graphic symbol. In some instances, the retail contact information 70 may also include special offer information. In yet other instances, the retail contact information 70 may include retailer-specific order history, such as details of the most recent order placed (if any). The list may be navigable, with each retailer being a selectable field. The selection of a retailer may initiate a call or other session, launch a request to access the retailer website, provide more detailed information regarding the retailer, or bring up a menu of options.

Figure 5:
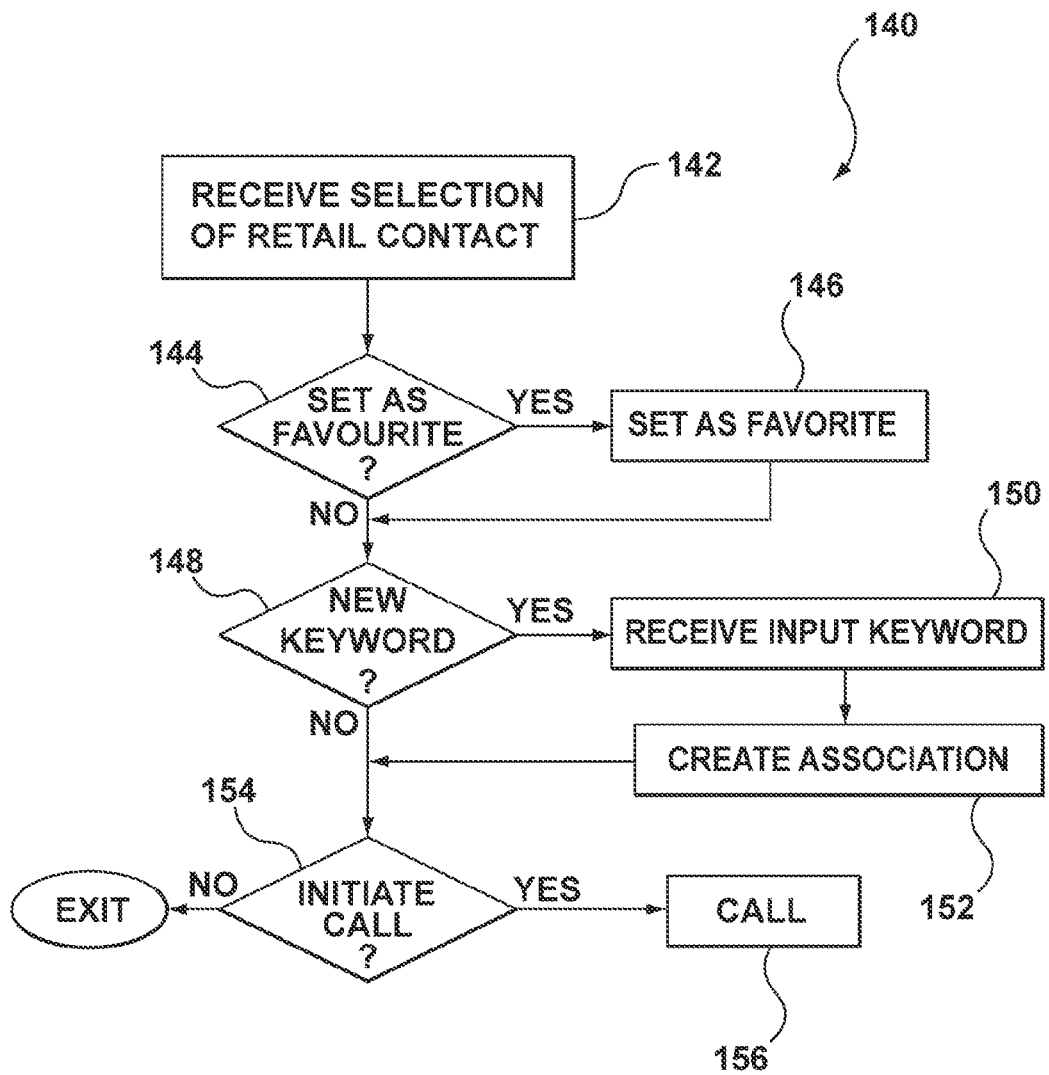
FIG. 5 shows, in flowchart form, a method for refining retailer-keyword associations.

Reference is now made to FIG. 5, which shows, in flowchart form, a method 140 for refining retailer-keyword associations. The method 140 starts with selection of a particular retail contact. The selection may be made from the retail contact GUI, listing retail contacts associated with a given keyword 72. Alternatively, the selection may be made from a retail contact browse listing, in which all retail contacts are accessible.

The selection of the particular retail contact may result in display of a number of options on the display screen 22. The options may be displayed in an overlay menu, in GUI buttons, as softkeys, or in some other manner. Among the options may be "Make Favorite", "Add Keyword", and "Call". These terms are illustrative examples, and may take a different form in other embodiments.

Continuing with this example, the method 140 may include assessing whether a request has been input to make the particular retail contact a "favorite", as shown in step 144. In one embodiment, this may include marking or otherwise designating the particular retail contact as a "favorite" (step 146). The impact of such a designation may be that the retail contacts identified as "favorites" may be displayed at the top of any list generated as a result of a query. In another embodiment, the marking of a retail contact as a "favorite" is specific to its association with a given keyword. For example, Dominos™ may be marked as a "favorite" in connection with the keyword "pizza", but not necessarily a "favorite" in connection with the keyword "food". In a keyword search for "pizza", Dominos™ would be designated a favorite and displayed near the top of the retail contacts list; however in a keyword search for "food" it would not enjoy the same status. In this embodiment, the favorite designation may be saved or stored within the association 74 rather than the retail contact information 70, so the favorite designation is specific to a given keyword 72.

The display of retail contacts in response to a keyword inquiry can be influenced by a number of factors, depending on the policy settings within the device. For example, a keyword search may result in display of retail contacts on the basis of most recently selected, designated favorite, closest in location, or based on other factors or a combination of such factors. The device may provide user configurable settings, such as "show alphabetically", "show most selected", "show only favorites", "show most recently selected", etc.

Method 140 may also include an assessment of whether a new keyword has been requested (step 148). If so, then the call application 56 may be configured to display a new keyword input screen containing an input field for receiving the new keyword. In some instances, the new keyword may be a voice keyword received through the microphone. Step 150 indicates receipt of the new keyword. In step 152 and association is created and stored linking the new keyword to the particular retail contact selected in step 142.

In some instances, the keywords 70 that have a single associated retail contact and/or that have a single designated favorite retail contact may be displayed (in a keyword browsing GUI, as described above) with the associated retailer's logo. This provides a visual link between the keyword 72 and the associated or designated favorite retail contact through its logo.

Method 140 may also include the option of initiating a call. The device 10 may receive a call command, as shown in step 154. If a call command is received (for example, by menu selection or keypad input), then in step 156 a call is initiated to the primary telephone contact number stored in the retail contact information 70 for the particular retail contact selected in step 142. The details of initiating a voice call will be understood by those skilled in the art and are not elaborated upon here.

Figure 6:
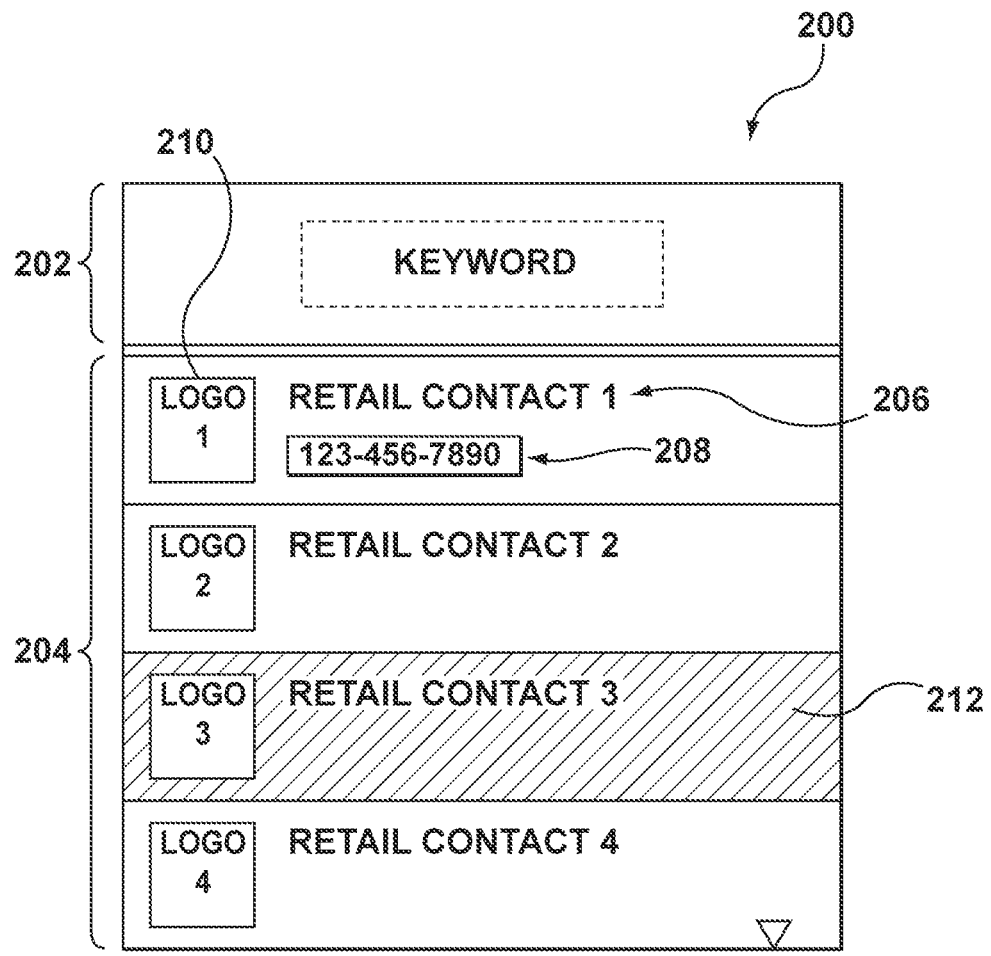
FIG. 6 shows an example of a retail contact GUI on the display screen of the mobile communication device.

Reference is now made to FIG. 6, which diagrammatically shows an example of a retail contact GUI 200 on the display screen 22 (FIG. 1) of the mobile communication device 10 (FIG. 1). The GUI 200 is the retail contact browsing GUI generated by the retail contact GUI module 64. The GUI 200 may be displayed as a result of a query for a keyword 72 (FIG. 2B). In another situation, the GUI 200 may be displayed as a result of a browse command. The GUI 200 in this situation may display all the retail contacts, or a subset of them, ordered based on selectable sorting filters (e.g. "show only favorites", "show closest", "show most recently used", etc.).

The GUI 200 in this example embodiment includes a header portion 202 and a scrollable body portion 204. The scrollable body portion 204 includes a list of retail contacts. In some embodiments, they may be in a format other than a list. For example they may be tiled in a grid format, or in other layouts. The header portion 202 includes the keyword 72 used to select the retail contacts, if any. In the case of browsing, the header portion 202 may display the current filter used, e.g. "Favorites", "Closest", etc., or may display the associated keyword(s) 72 for any retail contact that is currently selected within the body portion 204.

In this embodiment, the body portion 204 is divided into a list of vertically arranged scrollable fields each containing one of the retail contacts. The retail contact information 70 (FIG. 2B) is retrieved to populate the fields. In particular, each field may include the retail contact name 206, a contact address 208 such as a phone number, and a graphic or logo 210 associated with the retail contact. This may be a design mark symbol for the retail contact.

Selection of one of the retail contacts displayed in the GUI 200 may launch a further GUI displaying additional details of the retail contact obtained from the retail contact information 70 and/or retail history data 76 (FIG. 2B). The additional information may include website links, location information, maps, and further contact details. It may also include more dynamic information, such as current specials or promotions, coupons, order history, or details of last order placed. It will be understood that some or all of this additional information may be displayed in the initial GUI 200 depending on size or layout restrictions. In some cases, the field for a given retail contact may be highlighted 212 or otherwise marked to indicate that additional dynamic information, such a special offer or promotion or a coupon, is available to be viewed.

In some embodiment, the retail contact, or a third party under contract to the retail contact, such as a carrier, may push non-message data out to mobile communication devices 10 for inclusion in the retail contact information 70. For example, the retail contact or the third party may push out logo updates, contact address updates, or additional retail contact changes. In some instances, the retail contact or third party may push out more dynamic information, such as coupons, special offers, promotional information, etc. This information may have an expiry date associated with it. On the expiry date, the device 10 may be configured to purge the expired information from the retail contact data 58.

The additional information, such as special offers or coupons, may include a selectable link, such as a hyperlink, to launch a browser and access the retailer's online order site. The link may also cause pre-population of an order form with the special offer details and/or the user's contact information.

In some cases, instead having a separate GUI to display additional information, the GUI 200 may display additional information in an overlay when the retail contact is selected or when a cursor is held over the retail contact. Other display options will be understood by those skilled in the art.

Figure 7:
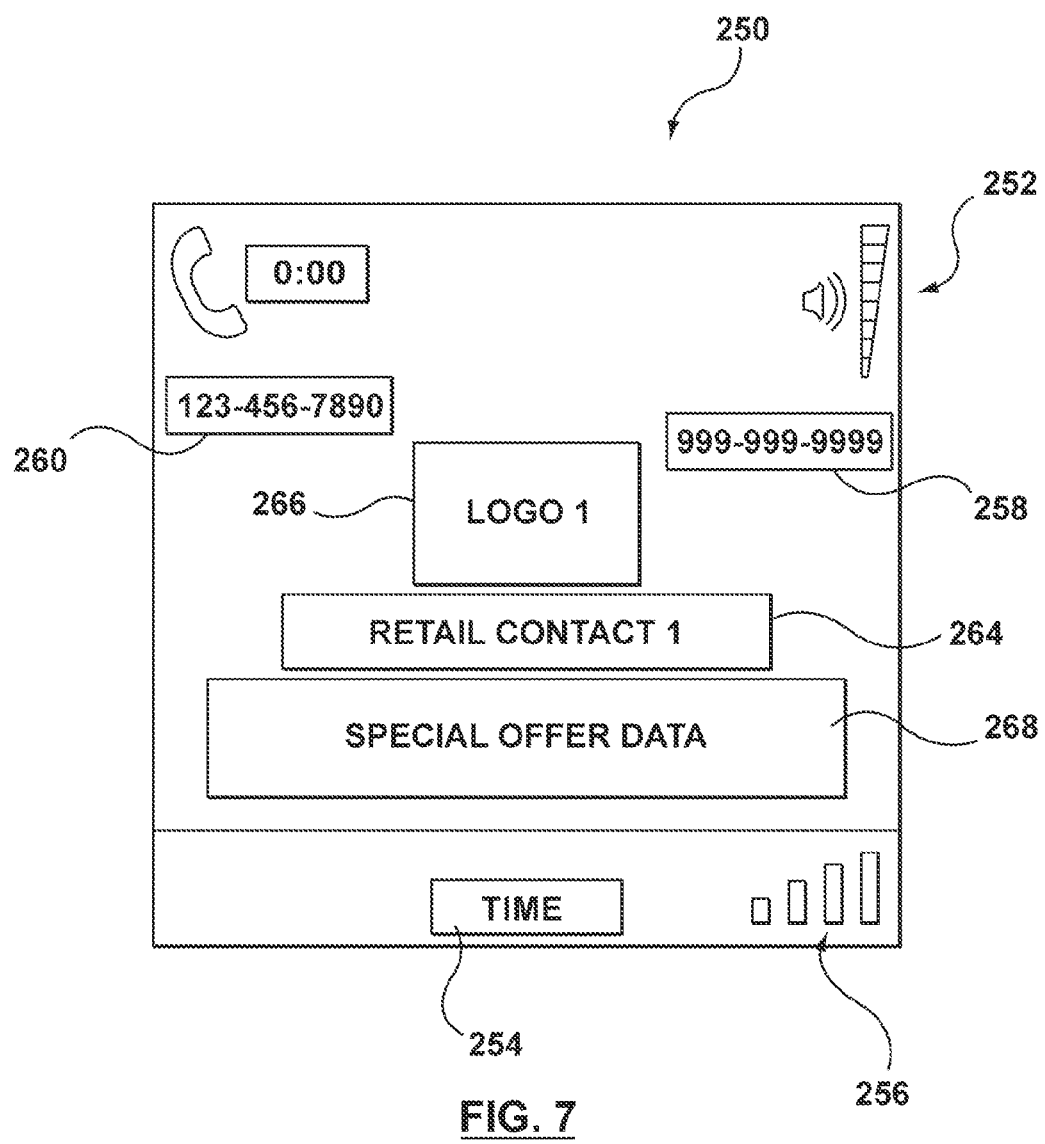
FIG. 7 shows a graphical illustration of an example active call GUI on the display.

Reference is now made to FIG. 7, which shows a graphical illustration of an example active call GUI 250 on the display 22. The active call GUI 250 contains the information displayed when an active voice call is being placed. The GUI 250 may contain a number of fields common to such displays, such as a volume indicator 252, a current time field 254, a signal strength indicator 256, a device phone number field 258, a called number field 260, and an elapsed call duration field 262.

The GUI 250 in this embodiment also includes a retail contact name field 264 and displays the retail contact logo 266 or other graphic. In some instances, the logo 266 may be rendered as a background upon which the other elements are rendered, possibly in a semi-transparent form.

The GUI 250 may also include a special offer field 268. Rather than retrieving special offer data from the retail contact data 58 stored on the device 10, this field may be used to display special offer data obtained live over a data channel whilst the voice call is ongoing with the retail contact. In this embodiment, the device 10 establishes a voice channel and parallel data channel with the retail contact. Those ordinarily skilled in the art will appreciate that various telecommunications standards permit connections to be set up that support simultaneous voice and data communications.

The device 10 may be configured to output an alert if special offer information is received for display. The alert may be an audible tone or beep, a vibration, etc.

In some instances, the call application 56 may configured to display a menu for the retail contact during an active call. For example, the GUI 200 may be adapted to include a field for displaying menu options (in some cases a scrollable field) obtained from the retail contact's website or another remote location.

Figure 8:
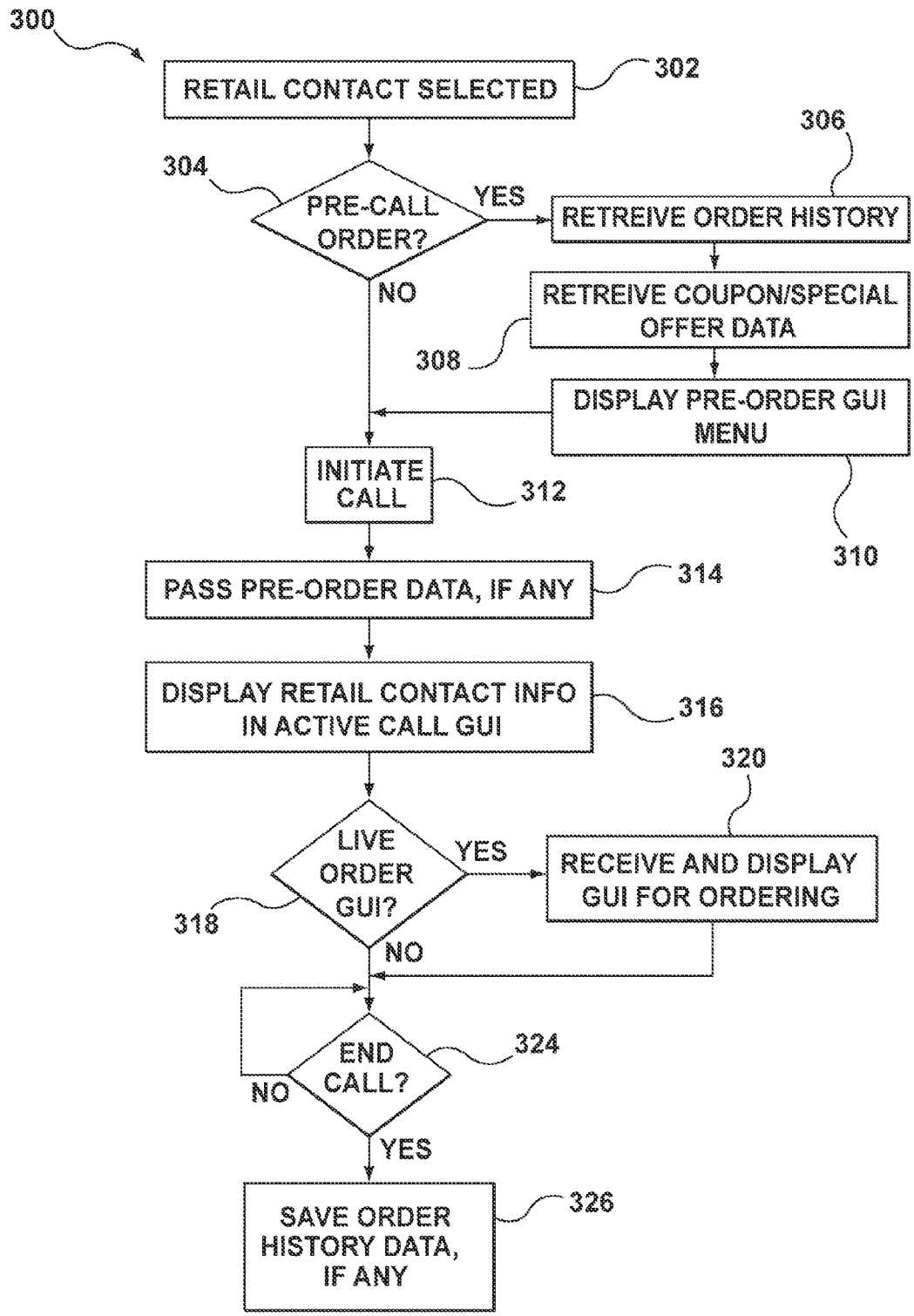
FIG. 8 shows, in flowchart form, an example method of enhanced order processing.

Reference will now be made to FIG. 8, which shows, in flowchart form, an example method 300 of enhanced order processing. In this example method 300, the device 10 first receives selection of a retail contact as indicated in step 302. This selection may be made in any manner, such as through keyword query, contact browsing, phone number input, etc.

In some embodiments, the retail contact and/or call application 56 may facilitate pre-call order entry, as indicated in step 304. If pre-call order entry is available and/or selected, then in step 306 the device 10 may retrieve retail history data 76 from memory for the selected retail contact. The retail history data 76 may include details of previous order's placed with the retail contact, preferred payment details, favorite menu items, etc. Step 308 may include retrieval and display of special offer or coupon data. This information may be retrieved from the retail contact information 70, the retail history data 76 or from the retail contact's website or another remote address. In step 312, the device 10 may display selectable order details, in some cases pre-populated with data retrieved from device memory, such as favorites or payment details. The order form and format may be set by the device 10 or may be a form obtained by the device 10 from the retail contact during a previous communication session.

In step 312, having optionally pre-established some of the order data, the call to the retail contact is initiated. Once the call is established, using a communications protocol that permits for simultaneous voice and data connections, then in step 314 pre-call order information obtained in step 310 is transmitted to the retail contact over the data channel. The retail contact information 70 may be displayed in the active call GUI in step 316, for example as outlined above in connection with FIG. 7.

In some embodiments, and with some retail contacts, the GUI may support dynamic order processing. In such an embodiment, the device 10 may receive order details as entered and processed by the retail contact. The device 10 displays the order details in the active call GUI as they are received during the course of the voice call. Accordingly, the user of the device 10 may visually verify that the order communicated orally has been correctly entered and received by the retail contact. For example, the retail contact may be a restaurant, and the order may be a delivery order. As the user communicates his or her order to the retail contact over the voice call (perhaps referencing special offer information displayed on the GUI when the call is initiated), the retail contact system transmits order data to the device 10 over a data channel, and the device 10 displays the order data, allowing the user to visually verify the accuracy of the order. Additional information, such as an estimated time of delivery and a delivery location may also be displayed for verification by the user of the device 10. Step 318 in method 300 indicates the determining that the order GUI is live. Step 320 in method 300 indicates the reception and display of order data from the retail contact system.

In yet other embodiments, the active call GUI may facilitate order entry by displaying options for user selection. Selections input to the device 10 may then be communicated to the retail contact system during the course of the voice call. The selections may relate to order data or payment details. In some instances, the input data may be a security code or passcode to verify payment details, such as a credit card PIN or other code. By communicating this through a simultaneous data channel instead of orally, security is maintained over the secret information.

At some point a command is received by the device 10, either over the network (from the retail contact) or through an input device on the device 10, to end the call (step 324). Order history, if any, may then be saved to the retail history data 76 (step 326).

Those ordinarily skilled in the art will appreciated that many of the steps and operations outlined in the foregoing methods may be performed in different orders without materially affecting the operation of the method.

Although some of the foregoing embodiments relate to a "call" or "voice call", it will be appreciated that the present application is not limited to voice calls and may include other sessions and other media. In addition, the "call" or "voice call" may include data or text only sessions, including HTTP sessions, instant messaging sessions, and others. In some embodiments the foregoing methods may be applied to Web-based online ordering through a website. Modifications for particular applications or embodiments will be understood by those skilled in the art having regard to the description herein.

Certain adaptations and modifications of the described embodiments can be made. Therefore, the above discussed embodiments are considered to be illustrative and not restrictive.

What is claimed is:

1. A method of connecting with a retail contact using a mobile communication device, the mobile communication device having a display and an input device, the method comprising:

storing retail contact data in memory on the mobile communication device, wherein the retail contact data includes retail contact information detailing a plurality of retail contacts, a plurality of keywords, and a plurality of associations linking each retail contact to one or more of the keywords;

storing a favorite designation within at least one of the associations;

receiving an input search term through the input device;

determining that the input search term matches one of the keywords;

identifying each retail contact linked to the matching keyword by one of the associations and retrieving retail contact information for each of the identified retail contacts;

determining that one of the retrieved retail contacts in connection with the matching keyword is a favorite contact based on the favorite designation within the association between the matching keyword and the one of the retrieved retail contacts;

displaying, on the display, a list including the retrieved retail contact information for retail contacts linked to the matching keyword, including displaying, at the top of the list, retail contact information for the favorite contact;

receiving a selection of one of the retail contacts displayed on the display;

initiating a communication with the retail contact using a retail contact electronic address contained within the retail contact information for the selected one of the retail contacts;

receiving a new keyword command relating to the selected retail contact; and responsive to the receiving the new keyword command:
displaying an input field,
receiving an input keyword, and
storing the input keyword and a new association linking the input keyword to the selected retail contact.

2. The method claimed in claim 1, wherein the communication comprises a voice call.

3. The method claimed in claim 2, wherein the retail contact information for the selected retail contact further includes a graphic logo, and wherein said initiating includes displaying an active call user interface, and wherein the active call user interface includes the graphic logo.

4. The method claimed in claim 2, wherein the retail contact information for the selected retail contact further includes special offer information received from the retail contact, and wherein said initiating includes displaying an active call user interface, and wherein the active call user interface includes displaying the special offer information.

5. The method claimed in claim 2, wherein said initiating includes displaying an active call user interface, and wherein the active call user interface includes a field for displaying information received from the retail contact over a simultaneous data channel.

6. The method claimed in claim 5, wherein the information received from the retail contact includes details of an order entered at a retail contact system.

7. The method claimed in claim 1, wherein the communication comprises an HTTP request to access a webpage.

8. The method claimed in claim 7, wherein the webpage comprises a retail order entry page.

9. The method claimed in claim 1, wherein said retrieving retail contact information for each of the identified retail contacts includes retrieving order history data containing data regarding past orders placed with the identified retail contacts.

10. The method claimed in claim 9, wherein said displaying includes ranking the identified retail contacts based on their respective past orders and displaying the retail contacts in order of ranking.

11. A mobile communication device comprising:
a processor;
a memory;
an input device;
a display;
a communication subsystem; and
a contact application stored in memory and containing instructions for configuring the processor to connect with a retail contact by:
storing retail contact data in said memory, wherein the retail contact data includes retail contact information detailing a plurality of retail contacts, a plurality of keywords, and a plurality of associations linking each retail contact to one or more of the keywords,
storing a favorite designation within at least one of the associations;
receiving an input search term through the input device,
determining that the input search term matches one of the keywords,
identifying each retail contact linked to the matching keyword by one of the associations and retrieving retail contact information for each of the identified retail contacts,
determining that one of the retrieved retail contacts in connection with the matching keyword is a favorite contact based on the favorite designation within the association between the matching keyword and the one of the retrieved retail contacts;
displaying, on the display, a list including the retrieved retail contact information for retail contacts linked to the matching keyword, including displaying, at the top of the list, retail contact information for the favorite contact,
receiving a selection of one of the retail contacts displayed on the display,
initiating a communication with the retail contact using a retail contact electronic address contained within the retail contact information for the selected one of the retail contacts;
receiving a new keyword command relating to the selected retail contact; and
responsive to the receiving the new keyword command:
display an input field,
receive an input keyword, and
store the input keyword and a new association linking the input keyword to the selected retail contact.

12. The mobile communication device claimed in claim 11, wherein the communication comprises a voice call.

13. The mobile communication device claimed in claim 12, wherein the retail contact information for the selected retail contact further includes a graphic logo, and wherein said contact application configures the processor to display an active call user interface when initiating said communication, and wherein the active call user interface includes the graphic logo.

14. The mobile communication device claimed in claim 12, wherein the retail contact information for the selected retail contact further includes special offer information received from the retail contact, and wherein said contact application configures the processor to display an active call user interface, and wherein the active call user interface includes displaying the special offer information.

15. The mobile communication device claimed in claim 12, wherein said contact application configures the processor to display an active call user interface, and wherein the active call user interface includes a field for displaying information received from the retail contact over a simultaneous data channel.

16. The mobile communication device claimed in claim 15, wherein the information received from the retail contact includes details of an order entered at a retail contact system.

17. The mobile communication device claimed in claim 11, wherein the communication comprises an HTTP request to access a webpage.

18. The mobile communication device claimed in claim 17, wherein the webpage comprises a retail order entry page.

19. The mobile communication device claimed in claim 11, wherein said contact application configures the processor to retrieve retail contact information for each of the identified retail contacts by retrieving order history data containing data regarding past orders placed with the identified retail contacts.

20. The mobile communication device claimed in claim 19, wherein said contact application configures the processor to rank the identified retail contacts based on their respective past orders and display the retail contacts in order of ranking.

21. A non-transitory computer-readable medium having stored thereon computer-executable instructions which, when executed by a processor of a mobile communication device having a display and an input device, configure the processor to:
store retail contact data in memory on the mobile communication device, wherein the retail contact data includes retail contact information detailing a plurality of retail contacts, a plurality of keywords, and a plurality of associations linking each retail contact to one or more of the keywords;
store a favorite designation within at least one of the associations;
receive an input search term through the input device;
determine that the input search term matches one of the keywords;
identify each retail contact linked to the matching keyword by one of the associations and retrieving retail contact information for each of the identified retail contacts;
determining that one of the retrieved retail contacts in connection with the matching keyword is a favorite contact based on the favorite designation within the association between the matching keyword and the one of the retrieved retail contacts;
display, on the display, a list including the retrieved retail contact information for retail contacts linked to the matching keyword, including displaying, at the top of the list, retail contact information for the favorite contact;
receive a selection of one of the retail contacts displayed on the display;
initiate a communication with the retail contact using a retail contact electronic address contained within the retail contact information for the selected retail contact;
receive a new keyword command relating to the selected retail contact; and
responsive to the receiving the new keyword command:
display an input field,
receive an input keyword, and
store the input keyword and a new association linking the input keyword to the selected retail contact.

* * * * *